United States Patent
Yokota

[11] 4,063,801
[45] Dec. 20, 1977

[54] TELEPHOTO TYPE OBJECTIVE
[75] Inventor: Hideo Yokota, Tokyo, Japan
[73] Assignee: Canon Kabushiki Kaisha, Tokyo, Japan
[21] Appl. No.: 708,302
[22] Filed: July 26, 1976
[30] Foreign Application Priority Data
 Aug. 5, 1975  Japan .................................. 50-95119
[51] Int. Cl.² ............................................... G02B 9/60
[52] U.S. Cl. .................................................. 350/216
[58] Field of Search ....................... 350/214, 216, 255; 354/197

[56] References Cited
U.S. PATENT DOCUMENTS
2,503,789  4/1950  Wood et al. .......................... 350/255
3,854,797  12/1974  Yokota .................................. 350/214

*Primary Examiner*—Paul A. Sacher
*Attorney, Agent, or Firm*—Toren, McGeady and Stanger

[57] ABSTRACT

A telephoto type objective comprising a front lens group and a rear lens group axially spaced apart from each other. The front lens group has a positive refracting power and which remains stationary during focusing. The rear lens group has a negative refracting power and is comprised of two movable lens members for focusing. When the two movable lens members are moved along the optical axis toward an image plane, the telephoto type objective is caused to focus an object at a near distance from its focusing on an object at a far distance with the resulting amount of movement of the rear lens member being larger than that of movement of the front movable lens group.

13 Claims, 18 Drawing Figures

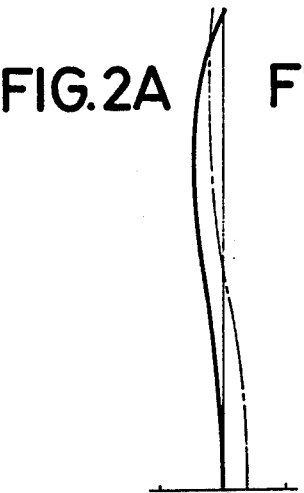
FIG.2A
Effective F-No.:3.5
-.5  .5
Spherical aberration
FIG.2B
Image height:21.6
-.5  .5
Astigmatism
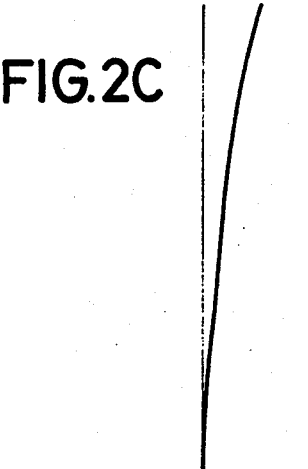
FIG.2C
Image height:21.6
-2‰  2‰
Distortion
FIG.2D
.2
-.2
Coma (Image height:15)
FIG.2E
Effective F-No.:3.7
-.5  .5
Spherical aberration
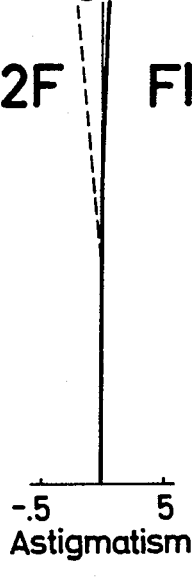
FIG.2F
Image height:21.6
-.5  .5
Astigmatism
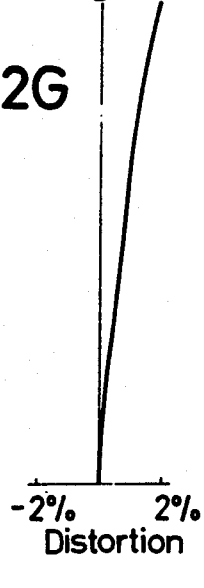
FIG.2G
Image height:21.6
-2‰  2‰
Distortion
FIG.2H
.2
-.2
Coma (Image height:15)

FIG.4A Spherical aberration (Effective F-No.:3.5, -.5 to .5)
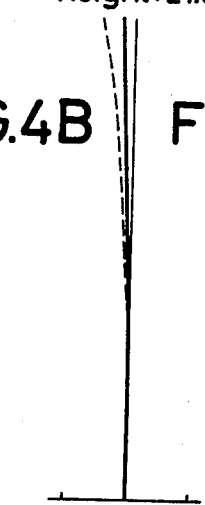
FIG.4B Astigmatism (Image height:21.6, -.5 to .5)
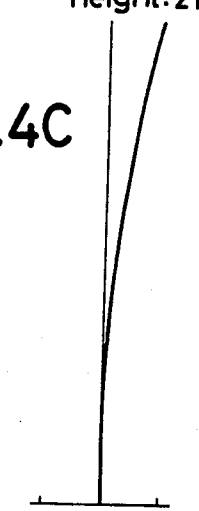
FIG.4C Distortion (Image height:21.6, -2% to 2%)
FIG.4D Coma (Image height:15), .2 to -.2
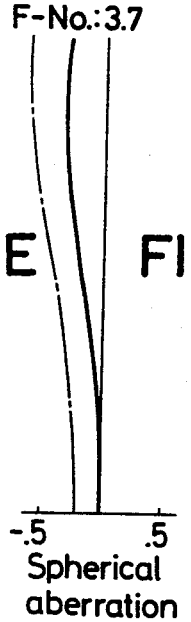
FIG.4E Spherical aberration (Effective F-No.:3.7, -.5 to .5)
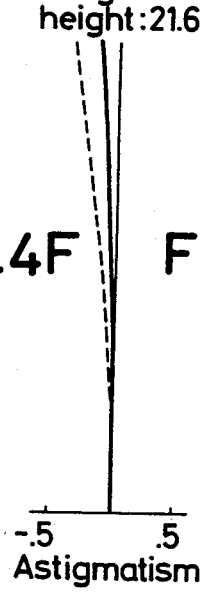
FIG.4F Astigmatism (Image height:21.6, -.5 to .5)
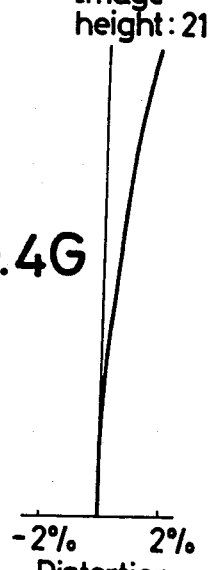
FIG.4G Distortion (Image height:21.6, -2% to 2%)
FIG.4H Coma (Image height:15), .2 to -.2

TELEPHOTO TYPE OBJECTIVE

BACKGROUND OF THE INVENTION

This invention relates to a telephoto type objective comprising a front lens group and a rear lens group which includes at least two members movable for focusing.

It is known to provide a symmetrical lens or triplet lens of which the rearmost lens element is movable for focusing, as disclosed in U.S. Pat. Nos. 2,503,789 and 3,020,804. In these patents, however, no account is taken of the fact that the image quality will be deteriorated when only one lens element is moved for focusing.

It is also known to provide a telephoto lens composed of convergent front and divergent rear lens groups, both of which are made movable as a unit for focusing purposes. In the course of development of new types of telephoto lens, however, it is considered possible to achieve the focusing by moving either the front lens group or the rear lens group.

If the telephoto lens is made bodily movable for focusing, as the amount of axial movement of the entire lens system through the focusing range is far larger than that of axial movement of the ordinary lens, and the weight and bulk of the telephoto lens are relatively large, it is proven that the focusing mechanism such as those employing helicoid structure requires not only large constructional dimensions with high production cost thereof but also a large driving torque with difficult management thereof.

In the case of focusing provision made at the rear lens group, it is possible to minimize the dimensions of the focusing mechanism with improved management thereof. Another advantage of this type telephoto lens is that the front lens group may be supported in fixedly secured relation to a camera body as the physical length between the front lens vertex and the image plane within the camera housing is maintained constant, thereby minimizing the probability of producing a jiggle or oscillation of the image at the focal plane by small accidental motion of the lens-and-camera assembly which is otherwise encountered particularly when the objective lens of the camera is telephoto in nature. With this type of telephoto lens, however, it is made more difficult to prevent deterioration of image quality resulting from variation of aberrations with focusing.

This difficulty can be overcome by employing an additional lens member arranged to be movable along with the focusing member to compensate for variation of aberrations caused by the focusing member. An example of such method is described in U.S. Pat. No. 3,854,797 assigned to the same assignee as the patent application, in which the rear lens group is divided into at least two sub-groups of which the image side one has a negative refracting power and is arranged to be moved toward the rear as the entire lens system is focused for shorter object distances, and another sub-group on the object side which has a strong divergent surface and is arranged to be moved toward the front in the same focusing as above. This arrangement, however, leads to an increase in the diameter of the front sub-group, or otherwise those of the axial rays which are to pass through the marginal portion of the rear sub-group are blocked by the lens cell holding the front sub-group when the entire system is focused for shorter object distances.

SUMMARY OF THE INVENTION

Accordingly, it is a primary object of the present invention to provide a new type of focusing lens arrangement which, though requiring no undue increase in the diameter of the front lens sub-group, will avoid the eclipse or shading which would occur when the front and rear lens sub-groups of the rear lens group are arranged to move in the opposite directions to each other for focusing purposes.

Thus, it is an object of the invention to provide a telephoto type objective which, while maintaining a high standard of aberration correction throughout the entire focusing range, is also capable of avoiding any undue increase in the diameter of the focusing members as well as in the complexity of the focusing mechanism.

To achieve this, the telephoto type objective of the invention is constructed as comprising a stationary front lens group and a rear lens group which includes at least two movable members arranged to be moved in the same direction with variation of the axial separation therebetween, for example, toward the image plane when the objective is focused for shorter object distances. In this case, the prerequisite is that the amount of axial movement of the member adapted to the focusing purpose be larger than that of axial movement of the member adapted to the compensation for variation of aberrations. On this account, these movable lens members are arranged so that when the objective is infinitely focused, the axial separation between the members is minimum, and also in such a manner as to be moved toward the image plane in differential relation as the object distance is decreased.

BRIEF DESCRIPTION OF THE DRAWINGS

FIG. 2 is aberration curves of FIG. 1 embodiment, wherein FIGS. 2A to 2D show various aberrations occurring when the objective is focused for object at infinity, and FIGS. 2E to 2H show various aberrations occurring when focused for object at a distance of 5 meters.

FIG. 4 is aberration curves of FIG. 3 embodiment, wherein FIGS. 4A to 4D show various aberrations occurring when the objective is focused for object at infinity, and FIGS. 4E to 4H show various aberrations occurring when focused for object at a distance of 5 meters.

DESCRIPTION OF THE PREFERRED EMBODIMENTS

Figure 1:
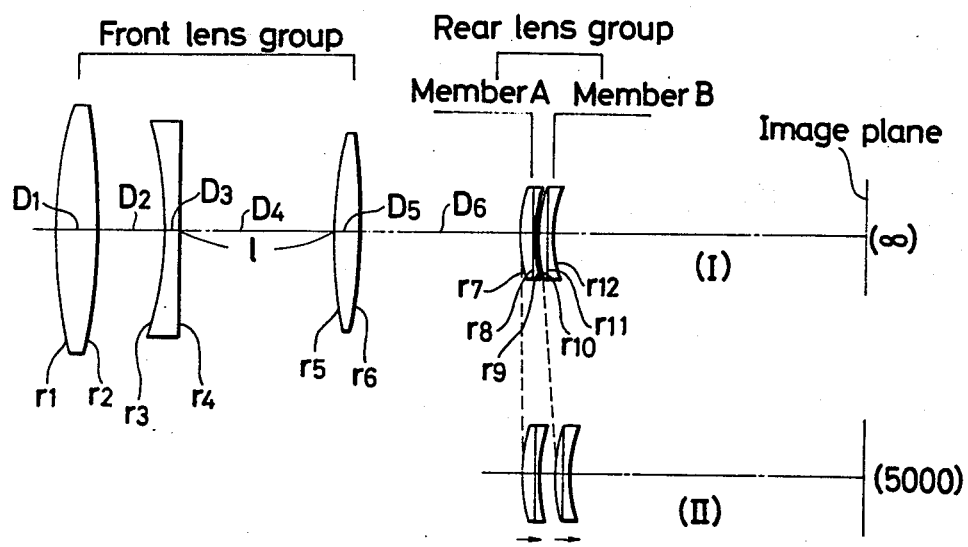
FIG. 1 is a block diagram of an embodiment of the telephoto type objective according to the present invention in two different focusing positions designated I and II with object at infinity and at a distance of 5 meters respectively.

Referring to FIG. 1, a preferred embodiment of a telephoto type objective is shown comprising a stationary front lens group having a positive refracting power and a rear lens group having a negative refracting power and comprised of two achromatic doublets A and B having positive and negative refracting powers respectively. The doublets A and B are arranged in this order with respect to incident light to be moved from their positions I to their positions II when the object distance is changed in focusing from infinity to 5 meters. The rear doublet B is adapted to effect the focusing, and therefore will be hereinafter referred to as "focusing member B", while the front doublet A is adapted to compensate for aberration variation caused by the movement of focusing member B, and therefore will be hereinafter referred to as "compensating member A".

For facilitating the achievement of good stabilization of aberrations throughout the focusing range, it is preferred that focusing member B is configured with the strongest diverging surface of rearward concavity. If otherwise configured with the strongest diverging surface of forward concavity, remarkable spherical aberrations are produced at the close focusing region. The aforesaid preferred condition when satisfied, however, leads to the production of inward coma and positive astigmatism. In order to facilitate the compensation for these aberrations, it is preferred that compensating member A is configured with the strongest converging surface of forward convexity.

In practice, the following relationships must be satisfied to assist the achievement of a high standard of aberration correction which is a further object of the invention.

$$Sa < Sb \quad (1)$$

$$0.8f < fa < 2f \quad (2)$$

$$1.6 < (Ra/Rb) < 1.8 \quad (3)$$

$$Vb_1 - Vb_2 > 8 \quad (4)$$

wherein $Sa$ and $Sb$ are the amounts of axial movement of the members A and B respectively, $f$ is the focal length of the entire lens system, $fa$ is the focal length of the member A, $Ra$ is the radius of curvature of the strongest converging surface in the member A, $Rb$ is the radius of curvature of the strongest diverging surface in the member B, $Vb_1$ is the mean value of the Abbe numbers of the positive lens elements in the member B, and $Vb_2$ is the mean value of the Abbe numbers of the negative lens elements in the member B.

The function of each of the above relationships will be explained below.

The type of objective of the invention is characterized in that when the object distance is changed in focusing from infinity to a close range, the movable members A and B are moved in the same direction toward the image plane, while permitting the compensation for variation of aberrations with focusing. For this reason, inequality (1) must be satisfied.

The positive lens member A is adapted to have a function of compensating for spherical aberrations, but results in an adverse effect on the focusing function. On this account, inequality (2) is set forth. When the upper limit is violated, the spherical aberrations are under-corrected in the short distance region, while when the lower limit is violated, the amount of movement of the focusing member B is increased to such an extent that fabricating difficulties are introduced to the focusing mechanism as incorporated in the lens barrel.

As excessive movement of the compensating member A causes serious increase in variation of spherical aberrations, inequality (1) is also effective in avoiding remarkable under-correction of spherical aberrations.

In equality (3) is set forth for achieving the minimization of variation of coma under the conditions of inequalities (1) and (2). When the upper limit is violated, unacceptable inward coma is produced in the short distance region, while the lower limit is violated, undercorrection of shperical aberrations are resulted in the short distance region.

In order to achieve good stabilization of chromatic aberrations over the focusing range, it is required to employ positive and negative lens elements in constructing the focusing member B, and further that these elements satisfy inequality (4). If not so, variation of chromatic aberrations becomes excessive. In the practical embodiments of FIGS. 1 and 3, the focusing member B is shown as constructed from only one positive and only one negative lens elements, but it may be constructed from two or more lens elements in the same sign.

The telephoto type objective of the invention having a rear lens group R characterized by the above described relationships makes it more difficult as compared with the known type telephoto lens to perform correction of spherical aberration due to the divergent lens elements. On this account, the front lens group F must be well corrected in itself for various aberrations, thereby creating a difficult problem of correcting coma. In order to provide for the objective of the invention a large relative aperture, therefore, it is desired to set forth specific requirements for construction and arrangement of the various elements of the front lens groups F.

Figure 3:
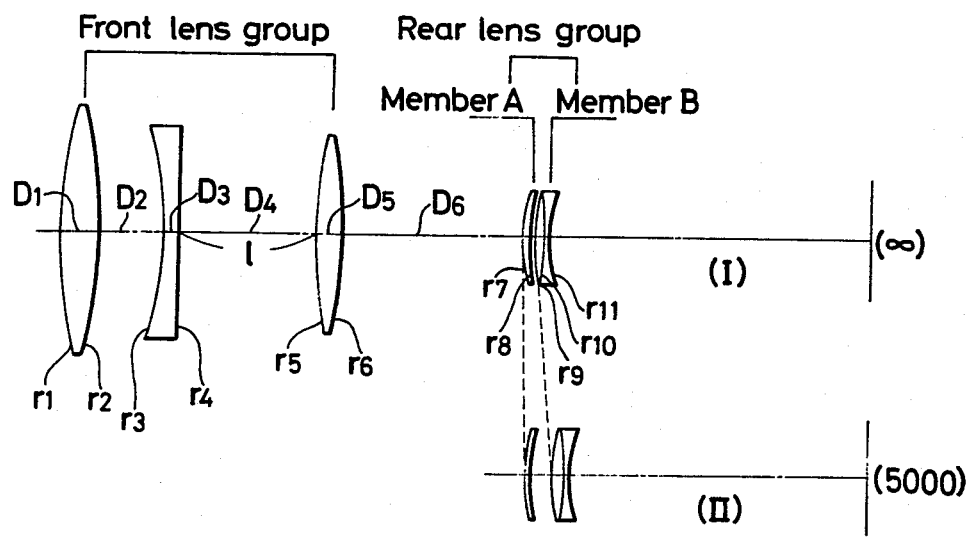
FIG. 3 is a block diagram of another embodiment of the telephoto type objective according to the present invention in two different focusing positions I and II with object at infinity and at a distance of 5 meters respectively.

Thus, in the preferred embodiments of FIGS. 1 and 3, the front lens group F is constructed in the form of the so-called Taylor triplet, namely, a positive lens member, a negative lens member and a positive lens member arranged in this order from the front to increase the capabilities of correcting chromatic aberrations as well as other various aberrations, and is characterized by the following relationships:

$$-0.95 < (R_1R_2) < -0.8 \quad (5)$$

$$-0.45f < R_3 < -0.38 \quad (6)$$

$$0.15f < l < 0.2f \quad (7)$$

wherein $R_1$ and $R_2$ are the radii of curvature of the front and rear surfaces of the first lens member counting from the front, $R_3$ is the radius of curvature of the front surface of the second lens member, and $l$ is the axial separation between the second and third lens members.

When the upper limit of inequality (5) and the lower limit of inequality (6) are violated, coma is deteriorated, while when the lower limit of (5) and the upper limit of (6) are violated, spherical aberration is deteriorated.

In order to minimize variation of astigmatism with focusing at the widest aperture, it is required to satisfy inequality (7). When the upper limit is violated, spherical aberration becomes large at the intermediate height region of light incidence, while when the lower limit is violated, unacceptable negative astigmatism is produced.

The two embodiments of the telephoto type objective of the invention represented in FIGS. 1 and 3 may be constructed in accordance with the numerical data given in Tables 1 and 3 respectively, in which the radii of curvature, R, and the axial separations between the successive surfaces, D, along with the indices of refraction Nd for the spectral D line of sodium and the Abbe numbers Vd for the various lens elements are all expressed with the corresponding numbers counted from the front to the rear. The minus values of the radii, R, indicate surfaces concave toward the front. The aberration coefficients of the telephoto type objective of FIGS. 1 and 3 with object at infinity are given in Tables 2 and 4 respectively, in which L: axial chromatic aberration; T: lateral chromatic aberration; LS: axial chromatic aberration of pupil; Sa: spherical aberration; CM: coma, AS astigmatism; PT: Petzval sum; and DS: distortion. Aberration correction attained in the objective according to the data of Table 1 when focused for object at infinity or at a distance of 5 meters measured from the image plane is shown respectively in FIG. 2A or 2E for spherical aberration and sine condition, FIG. 2B or 2F for astigmatism, FIG. 2C or 2G for distortion, and FIG. 2D or 2H for coma. In the case of the objective according to Table 3, aberration correction for object at infinity or at a 5 meters distance is shown respectively in FIG. 4A or 3E for spherical aberration and sine condition, FIG. 4B or 4F for astigmatism, FIG. 4C or 4G for distortion and FIG. 4D or 4H for coma.

Table 1

| | | | f = 278.6 − 251.4 f-number: F/3.5 Image angle: 4.4° | | | |
|---|---|---|---|---|---|---|
| Lens | | Number | R | D | Nd | Vd |
| Front lens group | | 1 | 173.019 | 14.05 | 1.61800 | 63.4 |
| | | 2 | −202.393 | 23.17 | | |
| | | 3 | −114.403 | 5.2 | 1.73000 | 31.2 |
| | | 4 | 3480.006 | 51.78 | | |
| | | 5 | 183.248 | 7.78 | 1.61800 | 63.4 |
| | | 6 | −231.576 | Variable | | |
| Rear lens group | Member A fa = 316 | 7 | 65.632 | 4.0 | 1.70000 | 55.2 |
| | | 8 | 595.390 | 1.0 | 1.65000 | 33.4 |
| | | 9 | 84.857 | Variable | | |
| | | 10 | 100.459 | 3.0 | 1.73500 | 33.0 |
| | Member B fb = −103.4 | 11 | −176.924 | 1.0 | 1.69350 | 53.3 |
| | | 12 | 39.579 | | | |

Overall focal length, lens separation and back focal length during focusing

| Object distance | f | $D_6$ | $D_9$ | BK |
|---|---|---|---|---|
| Infinity | 278.6 | 52.56 | 1.22 | 104.98 |
| −5000 | 251.4 | 54.06 | 6.09 | 98.6 |

Table 2

| | L | T | LS | SA | OM | AS | PT | DS |
|---|---|---|---|---|---|---|---|---|
| 1 | 0.011936 | −0.014750 | 0.027390 | 0.985071 | −1.217335 | 1.504364 | 0.614925 | −2.618984 |
| 2 | 0.022649 | −0.048743 | 0.088944 | 13.860509 | −29.829110 | 64.195031 | 0.525680 | −139.285017 |
| 3 | −0.054744 | 0.111720 | −0.192133 | −20.141722 | 41.104509 | −83.884616 | −1.027417 | 173.285452 |
| 4 | 0.003619 | −0.023737 | 0.040438 | 0.010216 | −0.067009 | 0.439533 | −0.033776 | −2.661499 |
| 5 | 0.004637 | 0.000919 | −0.001287 | 0.038411 | 0.007613 | 0.001509 | 0.580600 | 0.115375 |
| 6 | 0.013445 | −0.025830 | 0.035380 | 5.277607 | −10.139274 | 19.479450 | 0.459433 | −38.306342 |
| 7 | 0.001193 | 0.008378 | −0.006596 | −0.021553 | −0.151343 | −1.062726 | 1.747587 | 4.809078 |
| 8 | −0.006314 | 0.010639 | −0.007884 | 0.156096 | −0.263017 | 0.443174 | −0.008340 | −0.732681 |
| 9 | 0.004097 | −0.018261 | 0.013298 | 0.165924 | −0.739533 | 3.296129 | −1.293150 | −8.927366 |
| 10 | −0.005911 | 0.020766 | −0.014568 | −0.336010 | 1.180493 | −4.147383 | 1.174641 | 10.444028 |
| 11 | 0.010343 | −0.013836 | 0.009146 | 0.314419 | −0.420573 | 0.562569 | 0.022237 | −0.782250 |
| 12 | −0.005991 | −0.005749 | 0.003716 | 0.010243 | 0.009828 | 0.009430 | −2.882052 | −2.756358 |
| Σ | −0.001041 | 0.001516 | −0.004156 | 0.319209 | −0.524750 | 0.836464 | −0.119631 | −7.416563 |

Table 3

| | | | f = 276.06 − 250.8 f-number: F/3.5 Image angle: 4.4° | | | |
|---|---|---|---|---|---|---|
| Lens | | Number | R | D | Nd | Vd |
| Front lens group | | 1 | 184.499 | 11.16 | 1.61800 | 63.4 |
| | | 2 | −201.838 | 23.15 | | |
| | | 3 | −114.3 | 5.2 | 1.73000 | 31.4 |
| | | 4 | 3543.068 | 46.49 | | |
| | | 5 | 182.695 | 7.88 | 1.61800 | 63.4 |
| | | 6 | −229.238 | Variable | | |
| Rear lens group | Member A fa = 484.1 | 7 | 69.773 | 1.72 | 1.72342 | 50.0 |
| | | 8 | 86.229 | Variable | | |
| | Member B fb = −131.1 | 9 | 84.282 | 3.0 | 1.73500 | 42.7 |
| | | 10 | −319.319 | 1.0 | 1.69350 | 53.3 |
| | | 11 | 41.236 | | | |

Overall focal length, lens separations and back focal length during focusing

| Object distance | f | $D_6$ | $D_8$ | BK |
|---|---|---|---|---|
| Infinity | 276.06 | 59.72 | 1.17 | 108.6 |
| −5000 | 250.8 | 61.72 | 7.3 | 100.5 |

Table 4
Aberration Coefficients with infinitely distant object

|    | L         | T         | LS        | SA         | CM         | AS         | PT        | DS         |
|----|-----------|-----------|-----------|------------|------------|------------|-----------|------------|
| 1  | 0.011093  | −0.010401 | 0.016703  | 0.790771   | −0.741427  | 0.695162   | 0.571500  | −1.187622  |
| 2  | 0.022355  | −0.042742 | 0.067549  | 13.003398  | −24.862664 | 47.537733  | 0.522404  | −91.891600 |
| 3  | −0.54379  | 0.097759  | −0.144385 | −19.368552 | 34.819600  | −62.596548 | −1.019132 | 114.364381 |
| 4  | 0.002530  | −0.021142 | 0.030890  | 0.003663   | −0.030607  | 0.255726   | −0.032877 | −1.861947  |
| 5  | 0.005533  | 0.000762  | −0.000917 | 0.093707   | 0.012914   | 0.577141   | 0.001780  | 0.079781   |
| 6  | 0.014109  | −0.023965 | 0.028111  | 5.529942   | −9.392662  | 15.953531  | 0.459963  | −27.878486 |
| 7  | 0.000795  | 0.010154  | −0.005343 | −0.007899  | −0.100885  | −1.288467  | 1.660788  | 4.755130   |
| 8  | 0.002013  | −0.011592 | 0.005872  | 0.074118   | −0.426807  | 2.457760   | −1.343827 | −6.414564  |
| 9  | −0.002332 | 0.013773  | −0.006646 | −0.071236  | 0.420770   | −2.485354  | 1.387566  | 6.484278   |
| 10 | 0.004122  | −0.004861 | 0.002163  | 0.238417   | −0.281153  | 0.331548   | 0.012211  | −0.405376  |
| 11 | −0.006178 | −0.006956 | 0.003000  | 0.015388   | 0.017326   | 0.019508   | −2.741488 | −3.064837  |
| E  | −0.000339 | 0.000790  | −0.003002 | 0.301716   | −0.565595  | 0.882379   | 0.054250  | −7.020862  |

What is claimed is:

1. A telephoto type objective comprising:
 a front lens group having a positive refracting power and which remains stationary during focusing, said front lens group being comprised of a plurality of lens members, and
 a rear lens group having a negative refracting power and positioned on the image side of said front lens group in axial alignment therewith, said rear lens group including at least two movable lens members arranged to be moved in the same direction along the common optical axis toward the image plane when the object distance is changed in focusing from infinitely distant object to close object with the resulting speed of movement of the front one of said two movable lens members being different from that speed of movement of the rear one.

2. A telephoto type objective according to claim 1, wherein said front lens member of said rear lens group moves at a slower speed than said rear lens member.

3. A telephoto type objective according to claim 2, wherein said rear movable lens member has at least one positive lens element and at least one negative lens element.

4. A telephoto type objective according to claim 2, wherein said front movable lens member has a front lens surface convex toward the front.

5. A telephoto type objective according to claim 1, wherein said front movable lens member of said rear lens group has a positive refracting power, and said rear movable lens member has a negative refracting power.

6. A telephoto type objective according to claim 5, wherein said front movable lens member has a plurality of surfaces including a strongest converging surface convex toward the front, and said rear movable lens member has a plurality of surfaces including a strongest diverging surface concave toward the rear, and wherein the focusing is effected with the resulting speed of movement of said front movable lens member being slower than that of movement of said rear movable lens member.

7. A telephoto type objective according to claim 6, wherein the mean value of the Abbe numbers of the positive lens elements in said rear movable lens member is larger than the mean value of the Abbe numbers of the negative lens elements therein.

8. A telephoto type objective according to claim 1, wherein said front lens group is comprised of a positive lens, a negative lens and a positive lens arranged in this order.

9. A telephoto type objective comprising:
 a primary lens group having a positive refracting power and which remains stationary during focusing, said primary lens group being comprised of a plurality of lens member, and
 two movable sub-groups positioned on the image side of said primary lens group in axial alignment therewith to be movable for focusing in such a manner that the image side one of said two sub-groups moves at a faster speed than the object side sub-group.

10. A telephoto type objective according to claim 9, wherein said image side sub-group has a negative refracting power, and said object side sub-group has a positive refracting power.

11. A telephoto type objective according to claim 9, wherein said image side sub-group has at least one positive and at least one negative lenses, and said object side sub-group is meniscus-shaped.

12. A telephoto type objective according to claim 9, wherein the axial separation between said primary lens group and said object side sub-group is larger than that between said two sub-groups.

13. A telephoto type objective according to claim 9, wherein said primary lens group is comprised of a positive lens, a negative lens and a positive lens arranged in this order.

* * * * *